Patented Dec. 23, 1952

2,623,033

UNITED STATES PATENT OFFICE 2,623,033

ELASTIC COPOLYESTERS AND PROCESS

Mark Dagenkolb Snyder, Tonawanda, N. Y., assignor to E. I. du Pont de Nemours and Company, Wilmington, Del., a corporation of Delaware No Drawing. Application March 20, 1950,
Serial No. 150,811

14 Claims. (Cl. 260—75)

This invention relates to linear copolyesters and especially to elastomers prepared from critical compositions of certain polyester-forming components. More particularly this invention relates to elastic fibers and films and like shaped structures prepared from such copolymers having a very high degree of extensibility coupled with a very high rate and degree of elastic recovery.

Most, if not all, synthetic materials, especially those that are fiber-forming and have been proposed for uses to replace rubber, have fallen far short of the properties of this unique material, especially in the rate of elastic recovery from deformation frequently referred to as "snap." Further, the synthetic elastomers have almost invariably fallen considerably short of rubber in that they are not capable of high elastic recovery, which for the purposes of this invention we are defining as of the order of 90% or better within one minute after an elongation of 100%. However, in the textile and allied fields rubber, whether natural or synthetic, possesses a number of disadvantags. For example, it cannot be used in garments without having its strands covered with such materials as cotton or rayon, because of its unpleasant and harmful effects when in contact with the skin. It is colored, possesses an unpleasant odor and is subject to deterioration under the influence of light and/or oxygen and rapidly loses its strength and elasticity with the passage of time. It is, therefore, desirable to find a new material which will possess high elasticity, but it is also of great importance to develop such a material which will, in addition, possess characteristics different from and superior to those of rubber. Filaments and fibers having a high degree of extensibility and high elastic recovery after elongation and being free from the undesirable characteristics possessed by rubber should occupy a place of considerable importance in the field of textiles and the like.

An object of this invention, therefore, is to provide a synthetic material capable of being formed into filaments, film and like structures which will possess the property high elastic recovery.

Another object is to provide a synthetic filament- and film-forming polymer having the high elastic recovery characteristic of rubber but which is free of the aforementioned disadvantages of rubber in the textile field. The above stated and other objects will more clearly appear hereinafter.

These objects are realized by the present invention, which, briefly stated, comprises copolymerizing, under melt polymerization conditions and within certain composition limits hereinafter set forth, at least one acyclic dicarboxylic acid of the formula:

HOOC—CH$_2$XCH$_2$—COOH wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon atoms as side chain substituents, with at least one symmetrical aromatic dibasic acid from the group consisting of terephthalic acid, bibenzoic acid ethylene bis p-oxybenzoic acid, tetramethylene bis p-oxybenzoic acid, and 2,6-naphthalic acid and with a polymethylene glycol of the formula HO(CH$_2$)$_n$OH wherein $n$ is a whole number from 2 to 6 inclusive. Fibers and films prepared from these copolyesters by the conventional melt or solvent spinning or casting techniques exhibit an elastic recovery, after orientation by cold drawing, of the order of 90% or better within one minute after an extension of 100%.

As representative acyclic dicarboxylic acids of the formula HOOC—CH$_2$XCH$_2$—COOH suitable for the purposes of this invention there may be mentioned suberic, HOOC(CH$_2$)$_3$(CH$_2$)$_3$COOH; azelaic, HOOC(CH$_2$)$_3$CH$_2$(CH$_2$)$_3$COOH; oxydibutyric, HOOC(CH$_2$)$_3$O(CH$_2$)$_3$COOH; sebacic,

5-oxa-1,10-decanedioic,

undecanedioic,

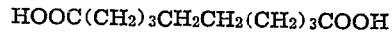

4-n-propyl suberic,

β-methyl-β'-ethyl suberic,

6,6-dimethyl undecane-1,11-dioic,

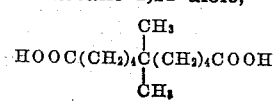

oxydivaleric,

HOOC(CH₂)₃CH₂OCH₂(CH₂)₃COOH 7-oxa-1,11-undecanedioic,

HOOC(CH₂)₃CH₂CH₂O(CH₂)₃COOH dodecanedioic,

HOOC(CH₂)₃CH₂CH₂CH₂CH₂(CH₂)₃COOH 5-oxa-1,12-dodecanedioic

HOOC(CH₂)₃OCH₂CH₂CH₂(CH₂)₃COOH tridecanedioic,

HOOC(CH₂)₃CH₂CH₂CH₂CH₂CH₂(CH₂)₃COOH 5-oxa-1,13-tridecanedioic,

HOOC(CH₂)₃OCH₂CH₂CH₂CH₂(CH₂)₃COOH 6-oxa-1,13-tridecanedioic,

HOOC(CH₂)₃CH₂OCH₂CH₂CH₂(CH₂)₃COOH oxydicaproic,

HOOC(CH₂)₃CH₂CH₂OCH₂CH₂(CH₂)₃COOH 5,8-dioxa-1,13-tridecanedioic,

HOOC(CH₂)₃OCH₂CH₂OCH₂(CH₂)₃COOH 5,9-dioxa-1,13-tridecanedioic,

HOOC(CH₂)₃OCH₂CH₂CH₂O(CH₂)₃COOH and 3,6,9-trioxa-1,11-undecanedioic,

HOOCCH₂OCH₂CH₂OCH₂CH₂OCH₂COOH

The relative amounts of aliphatic and aromatic acids to be used are critical since if too much of either one is used, the copolyester tends to be too crystalline to produce a highly elastic fiber or film. Therefore, to make the elastic copolyester of this invention, it is necessary that the aromatic acid comprise at least 30% and not over 60% by weight of the total acid component of the final polymer. A preferred range is 45–55% aromatic acid. It is a simple matter to obtain any desired ratio of acid components in any one copolyester. The acids will be present in the final polymer in the same ratio as they were present in the initial reactants provided an excess of the glycol is used. It should be understood, of course, that many combinations of the aliphatic and aromatic acids may be used. Thus, two or more aliphatic and/or two or more aromatic acids may be used to form the copolyester. It is also to be understood that the ester-forming derivatives of these acids can be used in place of, and are the full equivalents of, the acids herein as is generally the case in the manufacture of linear polyesters.

The melt polymerization process here employed is the now conventional procedure first described in Carothers Patents U. S. 2,071,250 and U. S. 2,071,251. Thus, the copolyesters may be prepared in the melt by the action of a glycol on the dibasic acids or one of their ester-forming derivatives. For example, the dimethyl esters of the acids involved together with an excess of a polymethylene glycol may be initially heated together in the molten state and at atmospheric pressure. After the ester interchange is complete, as indicated by the cessation of the evolution of methanol, the pressure is gradually reduced to the vicinity of 0.5 millimeter of mercury and the temperature increased to a range of 240–280° C. These conditions are maintained for about 4–5 hours with stirring, at which time a polymer of the desired intrinsic viscosity is obtained. For optimum results, this aliphatic/aromatic copolyester should have an intrinsic viscosity of the order of 1.0–1.5 or above although copolyesters having intrinsic viscosities as low as 0.6 are useful. For the purpose of this invention intrinsic viscosity is defined as:

$$\text{limit } \frac{ln\,\eta_r}{C} \text{ as } C \text{ approaches } 0$$

in which $\eta_r$ is the viscosity of a dilute solution of the polymer in a 60:40 mixture of phenol and tetrachloroethane divided by the viscosity of the solvent in the same units and at the same temperature, and C is the concentration in grams of the polymer per 100 cc. of solution.

Of course, depending on the particular reactants, the polymerization step (reduced pressure stage) may be longer or shorter and at a somewhat different temperature. The use of a catalyst will also change the timing of the cycle considerably. As suitable catalysts we refer to those disclosed in U. S. P. 2,465,319 (Whinfield and Dickson); the copending application of Emmette Farr Izard, Serial No. 26,915, filed May 13, 1948, and the copending application of Edward F. Cassasa, S. N. 41,397, filed July 29, 1948.

When the molten polymer above has reached the desired intrinsic viscosity, it can then be extruded in ribbon form upon a water cooled wheel, after which it is broken up into small chips. The chips then can, as desired, be melted in a grid melting assembly, excluding oxygen and moisture, and then extruded through a suitable orifice to form the shaped articles. Of course, it will be realized that this can be done in a continuous manner, in which the molten polymer is led through a suitable header to one or more spinning assemblies, thus making it unnecessary to extrude the polymer to form chip followed by remelting.

The temperature of the spinning or casting operation will vary, depending upon the spinning viscosity of the individual polymer, that temperature being used at which the polymer has a viscosity suitable for spinning under the conditions used. Generally speaking, this will be in the range of 150–275° C. Melt spinning is preferred, although solvent spinning may be used if desired.

Orientation and accelerated crystallization is effected by imparting a considerable degree of draw to the yarn after it has been extruded from the spinneret. Inasmuch as the yarns of this invention in the undrawn state tend to remain tacky for a long period of time, due probably to the uncrystallized character of the polymer and of the yarn when it is first made, accelerated crystallization induced by the drawing of the freshly formed yarn also serves to render the yarn non-tacky. Thus, if a yarn of this invention is drawn three times its length (3X) by passing it through drawing rollers, it is already set up to an essentially non-tacky state. On the other hand, heat treatment alone, at a temperature about 10° C. below the stick temperature of the copolymer, will accelerate crystallization and render the extruded articles non-tacky. Undrawn films prepared from the copolymers of this invention and heat treated in this manner have many uses.

The expression "stick temperature" of the polymeric material, as used herein, is defined as the minimum temperature at which a sample of the polymer leaves a wet molten trail as it is stroked with moderate pressure across a smooth surface of a heated block of brass.

It is preferred to relax the yarn as it passes beyond the drawing roller to a considerable extent in order to obtain a balance of the desired properties. After the yarn is drawn three times or more its length at the drawing roller, it may advantageously be wound up at a lower tension, for example at an overall winding rate of 2.5 times the spinning speed. The reason for this lies in the fact that with a greater degree of draw, tenacity and elastic recovery increase, elongation at break decreases and the amount of force required to extend the yarn to a given percentage (modulus of elasticity) also increases. Thus, drawing, relaxing and winding conditions are preferably so chosen as to obtain optimum relationship of yarn properties for a particular use.

In general, it is preferred that after orientation of the yarn and relaxation, the packaged yarn be allowed to age for 12–48 hours before use. This aging procedure may be speeded up if desired by heating. This hold-up time appears to allow equilibrium with respect to crystallization and allows production of a more uniform product.

The yarn or film, after shaping and orientation, is useful for many purposes. For some uses, however, the shrinkage on heating, is excessive (50–85%). This shrinkage may be reduced to practical limits, i. e. 5–10%, by a heat setting operation which can be carried out before or after conversion to a finished article. The heat-setting operation comprises heating the yarn, film or fabric to an elevated temperature, e. g., about 10° C. below its stick temperature, either in the presence or absence of a plasticizing agent for 15–45 minutes. If the stick temperature is 100° C. or higher, it may be desirable to conduct the heat-setting treatment in two stages. This operation consists of an annealing period of a few minutes at 60°–80° C., followed by a longer heat setting period at a temperature about 10° C. below the stick temperature.

Since elastic yarns of this invention are more suitable for textile purposes after undergoing a drawing operation, it is obvious that elastic films prepared from these polyesters will also be more useful when drawn to the desired extent, so that orientation and crystallization result. Since films are two-dimensional rather than uni-dimensional as in the case of fibers and filaments, a different drawing process is in order. One method is to extrude the film from a slot orifice and then draw the film longitudinally by means of a pinch roll system while at the same time drawing laterally by means of clamps, which are fastened at both edges of the film and move apart as the film is drawn longitudinally by the action of a pinch roll in a manner similar to that observed in finishing fabrics on a tenter frame. This film, during the two-dimensional drawing, may be heated by passing it over hot rolls during drawing or by means of hot inert gases, liquids or by induction heating. While it is preferred that two-dimensional orientation of the film takes place in two directions at the same time, this is not essential. The film, for example, may be drawn between two sets of rolls, first in one direction and then in another.

The following examples of certain preferred embodiments further illustrate the principles and practice of this invention. Parts are by weight unless otherwise indicated.

*Example I*

To 200 parts of dimethyl terephthalate and 200 parts of dimethyl sebacate are added 300 parts of ethylene glycol. The reactants are heated at 170° C. under atmospheric pressure in the presence of 0.04 part each of litharge and zinc borate until the ester interchange reaction is completed, as indicated by the cessation of ebullition of methanol. The temperature rises during the ester interchange operation, so that a temperature in the region of 225° C. is reached. Heating is then continued and as excess glycol is driven off, the system is gradually placed under vacuum and the temperature is raised to the vicinity of 275° C. The pressure on the system is reduced to 0.5 millimeter of mercury, and the melt condensation continues with the evolution of glycol for a period of 5 hours, while the reaction mixture is stirred vigorously. At the end of this time, the polymeric melt is extruded onto a water-cooled wheel in the form of a ribbon, so that it is rapidly quenched. This ribbon is broken into small chips suitable for remelting. The determination of intrinsic viscosity on this copolyester shows a value of 1.05.

The dried chips are next fed to a conventional melt spinning apparatus where they are melted, forced by a conventional spinning pump through a sand pack filter and extruded through a multi-holed spinneret into a cooling chamber where the filaments solidify. To prevent adherence of the initially tacky filaments, micronized talc is applied prior to winding the yarn into a suitable package.

The yarn is then drawn, followed by relaxation, so that a net draw ratio of 2.5X is realized. The properties are as follows with, for comparison, the equivalent properties for a representative rubber:

|  | Tenacity G. P. D.[1] at 100%/min. elongation | Elongation | Elastic recovery in 1 minute after an extension of 100% |
|---|---|---|---|
|  |  | *Percent* | *Percent* |
| Copolyester | 0.70 | 247 | 98.0 |
| Rubber | .12 | 700 | 99.8 |

[1] Grams per denier.

*Example II*

Following the same procedure as in Example I, 240 parts of dimethyl terephthalate and 160 parts of dimethyl sebacate, together with an excess of ethylene glycol, are polymerized to an intrinsic viscosity of 1.10. The polymer is then spun, followed by drawing and relaxing, to give a total net draw of 2.6X. After aging for 24 hours to establish equilibrium crystallinity, this copolyester is tested in the same manner as described previously and exhibits the following properties:

| Tenacity | Elongation | Elastic recovery |
|---|---|---|
|  | *Percent* | *Percent* |
| 0.98 G. P. D. | 208 | 96.5 |

*Example III*

Using 120 parts of dimethyl terephthalate and 280 parts of dimethyl sebacate with an excess of glycol, a copolyester of an intrinsic viscosity of 1.00 is prepared and spun as described previously. This is drawn, followed by relaxation, to give a net draw ratio of 3.5X. After aging for a few hours, this yarn is tested and exhibits the following physical properties:

| Tenacity | Elongation | Elastic recovery |
|---|---|---|
| 0.56 G. P. D | Percent 356 | Percent 98.0 |

Example IV

Using 220 parts of dimethyl terephthalate and 180 parts of dimethyl azeleate together with an excess of ethylene glycol, another elastic copolyester of this invention is prepared with an intrinsic viscosity of 1.25. This is spun and drawn, followed by relaxation, giving a net draw ratio of 4.1X. At this stage the yarn, when boiled off in the relaxed state in water having a temperature between 90 and 100° C., exhibits a shrinkage of the order of 50-60%. To demonstrate a method for stabilizing this yarn, the yarn is heat-treated at constant length by winding on a metal bobbin and subjecting it to steam at 110° C. for 30 minutes. After this treatment, the yarn has the following properties:

| Tenacity | Elongation | Elastic recovery | Shrinkage in 90° C. water |
|---|---|---|---|
| 0.94 G. P. D | Percent 302 | Percent 96.2 | Percent 7.0 |

Thus, it can be seen that for the higher temperature applications, it will generally be useful to heat-set the yarn prior to use.

Example V

Following the same procedure as in Example I, 200 parts each of dimethyl terephthalate and dimethyl 5-methyl azelate, together with an excess of ethylene glycol, are polymerized to an intrinsic viscosity of 1.10. The polymer is then spun followed by drawing and relaxing to a new draw of 3.5X. After aging for 48 hours this copolyester yarn is tested and exhibits the following properties:

| Tenacity | Elongation | Elastic recovery |
|---|---|---|
| 0.65 G. P. D | Percent 350 | Percent 97.4 |

Example VI

Following the same procedure as in Example I, 200 parts of dimethyl terephthalate, 50 parts of dimethyl suberate, 75 parts of dimethyl azelate, and 75 parts of dimethyl sebacate, together with an excess of ethylene glycol, are polymerized to an intrinsic viscosity of 1.25. The polymer is then spun followed by drawing and relaxing to a net draw of 3.2X. The yarn exhibits the following properties after aging 48 hours:

| Tenacity | Elongation | Elastic recovery |
|---|---|---|
| 0.75 G. P. D | Percent 250 | Percent 98.2 |

Example VII

Using 160 parts of the dimethyl ester of ethylene bis p-oxybenzoic acid and 240 parts of dimethyl sebacate, together with excess ethylene glycol, a copolyester is prepared according to the same general procedure of the previous examples, except that the polymerization or vacuum cycle is carried out for 10 hours at 260° C. A copolyester having an intrinsic viscosity of 1.25 is obtained. When this copolyester is spun into fibers, an elastic yarn is obtained, having:

| Tenacity | Elongation | Elastic recovery |
|---|---|---|
| 0.34 G. P. D | Percent 290 | Percent 98.5 |

Example VIII

Using the procedure of the preceding example, 140 parts of the dimethyl ester of ethylene bis p-oxybenzoic acid and 260 parts of dimethyl sebacate, together with ethylene glycol, are melt polymerized to give a copolyester having an intrinsic viscosity of 1.0. This material, on being spun, followed by drawing and relaxing to give a net draw ratio of 2.8X, exhibits after proper aging the following properties:

| Tenacity | Elongation | Elastic recovery |
|---|---|---|
| 0.27 G. P. D | Percent 350 | Percent 97.0 |

This same copolyester, if given a net draw ratio of 4.8X instead of 2.8X, changes slightly in properties to give the following:

| Tenacity | Elongation | Elastic recovery |
|---|---|---|
| 0.33 G. P. D | Percent 250 | Percent 97.5 |

Example IX 140 parts of tetramethylene bis p-oxybenzoic acid and 260 parts of dimethyl sebacate are copolymerized in the presence of ethylene glycol using the same general procedure of the preceding examples. The polymerization cycle is carried out for a period of 6½ hours at a temperature of 260° C. At the end of this time, a copolyester having an intrinsic viscosity of 1.16 is obtained. After spinning, followed by drawing and relaxation with appropriate aging, this copolyester has properties as follows:

| Tenacity | Elongation | Elastic recovery |
|---|---|---|
| 0.35 G. P. D | Percent 540 | Percent 98.5 |

Example X

Using the procedure of Example I, 175 parts of dimethyl bibenzoate and 250 parts of dimethyl sebacate, together with an excess of ethylene glycol, are polymerized to an intrinsic viscosity of 1.45. After spinning and drawing to a net draw of 2.0X, the yarn shows the following properties:

| Tenacity | Elongation | Elastic recovery |
|---|---|---|
| 0.60 G. P. D | Percent 220 | Percent 92.2 |

Example XI

Using the procedure of Example I, 60 parts of dimethyl terephthalate, 75 parts of dimethyl bibenzoate and 120 parts of dimethyl azelate, together with an excess of ethylene glycol, are polymerized to an intrinsic viscosity of 1.30. After spinning and drawing to a new draw of 2.5X, the yarn shows the following properties:

| Tenacity | Elongation | Elastic recovery |
|---|---|---|
| 0.55 G. P. D. | Percent 275 | Percent 93.6 |

Example XII

To illustrate the usefulness of glycols other than ethylene glycol, a copolyester is prepared using 200 parts of dimethyl terephthalate, 200 parts of dimethyl azelate and an excess of hexamethylene glycol. This is copolymerized in the same method as described previously using a polymerization cycle of 10 hours at a temperature of 260° C. to give a copolyester having an intrinsic viscosity of 0.85. This copolyester is then spun using the conventional melt spinning technique, and after drawing and relaxation to a net draw ratio of 3.5X, the yarn has properties as follows:

| Tenacity | Elongation | Elastic recovery |
|---|---|---|
| 0.96 G. P. D. | Percent 232 | Percent 95.4 |

Example XIII 200 parts of dimethyl terephthalate and 200 parts of dimethyl azelate, together with an excess of pentamethylene glycol, are copolymerized by the general process of this invention using a vacuum cycle of 9 hours at a temperature of 260° C. A copolyester having an intrinsic viscosity of 0.78 is thus obtained. This is melt spun and drawn, followed by relaxation, to a net draw ratio of 2.75X. After appropriate aging, the following properties are observed:

| Tenacity | Elongation | Elastic recovery |
|---|---|---|
| 0.75 G. P. D. | Percent 265 | Percent 92.7 |

Example XIV

A copolyester is prepared using 200 parts of the diethyl ester of oxydivaleric acid and 200 parts of the diethyl ester of terephthalic acid together with excess ethylene glycol. The polymerization cycle is carried out for 10 hours at temperature of 260° C. The copolymer of intrinsic viscosity of 0.94 is then spun, followed by drawing and relaxing, to give a total net draw ratio of 3X. After aging for several days to establish equilibrium crystallization, the copolyester exhibits the following properties:

| Tenacity | Elongation | Elastic recovery |
|---|---|---|
| 0.60 G. P. D. | Percent 200 | Percent 94.5 |

Example XV

Using the dimethyl ester of terephthalic acid and 5,8-dioxa-1,12-dodecanedioic acid with ethylene glycol under the conditions of Example 10, a copolyester with an intrinsic viscosity of 1.04 is prepared. This is spun, drawn and relaxed to give a net draw ratio of 3X. After appropriate aging, the yarn has properties as follows:

| Tenacity | Elongation | Elastic recovery |
|---|---|---|
| 0.75 G. P. D. | Percent 225 | Percent 92.5 |

The elastic polymer yarns of this invention are characterized by higher strength and higher stretch modulus than any rubber threads known. For the purpose of explanation, stretch modulus measures the force required to elongate the yarn a given percentage. A garment made of yarns having high tenacity and high stretch modulus will not only be durable but will also exert substantial pressure upon the body of the wearer after the garment is stretched into position. Yarns of this invention as compared with rubber threads may be spun readily into multifilament yarns. They may be spun in the lower deniers, have a very low inherent color, may be dyed by common dyestuffs, need no plasticizers or other foreign ingredients such as might later be leached out of the yarn, and have a good resistance to degradation by oxidation, exposure to light, soap, perspiration or greases and many other common chemicals. Furthermore, these elastic yarns have that property of rubber which is so lacking in other more or less quasielastic yarns made from synthetic, linear polymers, i. e., they are capable of very quick elastic recovery ("snap"). When the stress is relieved, the elastic structures of this invention very quickly resume their original shape. Therefore, it is apparent that a yarn or film of this type which has high extensibility and elastic recovery could be made useful in the fabrication of many articles, such as brassières, girdles, surgical hosiery, men's braces, bathing suits, stocking tops, suspenders, garters, pajamas, panties, knit shorts, woven shorts, anklets, sweaters, jackets, ski togs, dresses, blouses, shirts, caps and hats, gloves, tape, ribbons, laces, belting, shoe fabrics, slip covers, upholstery, window drapes, pile fabrics, e. g. carpets and light velvets, elastic bandages, knee and ankle braces, hair nets, covers for jars, dishes, etc., bags, ropes and balls.

A brief discussion of a few of these uses will serve to make obvious the special advantages of these copolyester elastic yarns. Resistance to perspiration is especially important for garters and elastic underwear of all types. Insensitivity to warm water, to alkaline soaps and to the leaching of detergents is important in all clothing items, upholstery and other washable fabrics. Resistance to oils, greases, ointments, etc. is of importance in the field of elastic bandages, knee and ankle braces, etc. The ability to spin in low denier yarns consisting of many fine filaments as opposed to the spinning of a solid elastic core and covering with yarn is of utility in all fields where softness and suppleness are desirable. In the fields of body control garments, finer fabrics are always in demand, a paramount desire of the industry being to obtain girdles of lesser weight and bulk and surgical hosiery of greater sheerness. Copolyesters of the type disclosed and claimed herein are of special advantage in the fields just mentioned, since their capacity to be spun in fine deniers and to be used without protective covering along with their higher strength and elastic modulus per unit cross-section make it possible to construct fabrics and garments having functional processes similar or superior to those already available yet with substantially lower attendant weight and bulk.

The yarns of this invention may be used for the manufacture of two-way stretch, woven and knitted articles. They may also be used as either warp or weft threads in one-way stretch fabrics. One form of this latter type of fabric to which the yarns in the present invention are particularly adapted is that in which the warp threads are composed of some other textile material and in which the weft threads are partly a material having low elongation and partly the elastic material of the present invention. In making this type of garment, the elastic yarns in the weft may be elongated to a certain percentage as they pass across the loom with the other textile material. The fabric, after the release of strain, loses width after the elastic yarns are permitted to exercise their elastic recovery, the non-elastic weft yarns also retracting part of their length together with the elastic yarns.

The invention has been described in terms of an elastic yarn, but it will be understood that the characteristics that make the yarn elastic are inherent in the polymer and the polymer can find other uses than in yarn. Among these may be mentioned adherent elastic coatings for glassine paper and the like, fabric coatings, conformable elastic films, heat-shrinkable closures for bottles and the like, safety glass interlayers, oil-resisting gaskets, flexible tubing and coatings for wire.

As many widely different embodiments can be made without departing from the spirit and scope of this invention it is to be understood that said invention is in no way restricted except as set forth in the appended claims.

I claim:

1. The process which comprises reacting under melt polymerization conditions a polymethylene glycol of the formula $HO(CH_2)_nOH$ wherein $n$ is a whole number from 2 to 6 inclusive, at least one acyclic dicarboxylic acid of the formula $HOOC—CH_2XCH_2—COOH$ wherein X is a linear chain composed of 4 to 9 atoms, in the chain of which not more than three may be oxygen atoms and the remaining are hydrocarbon carbon atoms, any two of such oxygen atoms being separated by at least two of such carbon atoms, the hydrocarbon atoms being saturated and containing a total of not more than three hydrocarbon carbon atoms as side chain substituents, and at least one symmetrical aromatic dibasic acid from the group consisting of terephthalic acid, bibenzoic acid, ethylene bis p-oxybenzoic acid, tetramethylene bis p-oxybenzoic acid, and 2,6-naphthalic acid, the aromatic acid comprising from 30% to 60% by weight of the total weight of acids, and continuing the polymerization until a copolyester having an intrinsic viscosity of at least 0.6 is formed.

2. The process of claim 1 wherein the aromatic acid comprises from 45% to 55% by weight of the total weight of acids.

3. The process of claim 2 wherein the glycol is ethylene glycol, the aromatic acid is terephthalic acid, and a mixture of acyclic dicarboxylic acids are used.

4. The process of claim 2 wherein the glycol is ethylene glycol, the aromatic acid is terephthalic acid, and a single acyclic dicarboxylic acid is used.

5. The process of claim 2 where the glycol is ethylene glycol, the aromatic acid is terephthalic acid, the acyclic dicarboxylic acid is sebacic acid.

6. The process which comprises reacting under melt polymerization conditions a polymethylene glycol of the formula $HO(CH_2)_nOH$ wherein $n$ is a whole number from 2 to 6 inclusive, with an aliphatic acid compound from the group consisting of acyclic dicarboxylic acids of the formula $HOOC—CH_2XCH_2—COOH$ wherein X is a linear chain composed of 4 to 9 atoms, in the chain of which not more than three may be oxygen atoms and the remaining are hydrocarbon carbon atoms, any two such oxygen atoms being separated by at least two of such carbon atoms, the hydrocarbon atoms being saturated and containing a total of not more than three hydrocarbon carbon atoms as side chain substituents, and ester forming derivatives of such acids, and with an aromatic compound from the group consisting of symmetrical aromatic dibasic acids from the group consisting of symmetrical aromatic dibasic acids from the group consisting of terephthalic acid, bibenzoic acid, ethylene bis p-oxybenzoic acid, tetramethylene bis p-oxybenzoic acid, and 2,6-naphthalic acid and ester forming derivatives of said aromatic acids, said aromatic compound comprising from 30% to 60% by weight based on the total weight of said aliphatic and aromatic compounds, and continuing the reaction until a copolyester having an intrinsic viscosity of at least 0.6 is formed.

7. The process of claim 6 wherein the aromatic compound comprises from 45% to 55% by weight, based on the total weight of said aliphatic and aromatic compounds.

8. The linear copolyester which results from the melt copolymerization of at least one acyclic dicarboxylic acid of the formula:

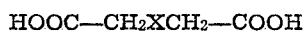

$$HOOC—CH_2XCH_2—COOH$$

wherein X is a linear chain composed of 4 to 9 atoms, in the chain of which not more than three may be oxygen atoms and the remaining are hydrocarbon carbon atoms, any two such oxygen atoms being separated by at least two such carbon atoms, the hydrocarbon atoms being saturated and containing a total of not more than three hydrocarbon carbon atoms as side chain constituents, with at least one symmetrical aromatic dibasic acid from the group consisting of terephthalic acid, bibenzoic acid, ethylene bis p-oxy-benzoic acid, tetramethylene bis p-oxybenzoic and 2,6-naphthalic acid, from 30% to 60% by weight of the aforesaid acid components of the copolyester being aromatic and an excess of a polymethylene glycol having from 2 to 6 carbon atoms and continuing the polymerization until a copolyester having an intrinsic viscosity of at least 0.6 is formed.

9. The product of claim 8, wherein the reactants are terephthalic acid, sebacic acid and ethylene glycol.

10. The product of claim 9, wherein the terephthalic acid comprises from 45% to 55% by weight of the acid components of the polyester.

11. The product of claim 8, wherein the reactants are terephthalic acid, 5-methyl azeleic acid and ethylene glycol.

12. The product of claim 8, wherein the reactants are terephthalic acid, suberic acid, azeleic acid, sebacic acid and ethylene glycol.

13. The product of claim 8, wherein the reactants are ethylene bis p-oxy-benzoic acid, sebacic acid and ethylene glycol.

14. The product of claim 8, wherein the reactants are tetramethylene bis pi-oxy-benzoic acid, sebacic acid and ethylene glycol.

MARK DAGENKOLB SNYDER.

REFERENCES CITED

The following references are of record in the file of this patent:

UNITED STATES PATENTS

| Number | Name | Date |
|---|---|---|
| 2,224,037 | Brubaker et al. | Dec. 3, 1940 |
| 2,437,046 | Rothrock et al. | Mar. 2, 1948 |
| 2,460,186 | Moffett | Jan. 25, 1949 |
| 2,465,319 | Whinfield | Mar. 22, 1949 |

FOREIGN PATENTS

| Number | Country | Date |
|---|---|---|
| 610,140 | Great Britain | Oct. 12, 1948 |
| 623,309 | Great Britain | May 16, 1949 |